United States Patent [19]

Coiera et al.

[11] Patent Number: 5,802,542
[45] Date of Patent: Sep. 1, 1998

[54] INFORMATION MANAGEMENT SYSTEM FOR A DYNAMIC SYSTEM AND METHOD THEREOF

[75] Inventors: Enrico William Coiera, Bath; Simon Charles Roger Lewis, Bristol, both of England

[73] Assignee: Hewlett-Packard Laboratories, Bristol, England

[21] Appl. No.: 409,444

[22] Filed: Mar. 24, 1995

[30] Foreign Application Priority Data

Mar. 24, 1994 [EP] European Pat. Off. ............ 94302119

[51] Int. Cl.⁶ .................................................. G06F 12/00
[52] U.S. Cl. .................... 711/4; 717/200; 364/550; 364/492; 364/494; 364/495
[58] Field of Search .......................... 364/550, 492, 364/554, 480, 494, 495; 395/828, 830, 835, 839, 392; 707/200; 711/4

[56] References Cited

U.S. PATENT DOCUMENTS

| | | | |
|---|---|---|---|
| 3,893,828 | 7/1975 | Archer | 96/19 |
| 4,258,421 | 3/1981 | Juhasz et al. | 364/424 |
| 5,067,099 | 11/1991 | McCown et al. | 364/550 |
| 5,077,666 | 12/1991 | Brimm et al. | |
| 5,200,744 | 4/1993 | Hiromoto et al. | 340/825.15 |
| 5,267,147 | 11/1993 | Harshaw et al. | 364/401 R |

FOREIGN PATENT DOCUMENTS

| | | |
|---|---|---|
| 0 482 523 A3 | 10/1991 | European Pat. Off. . |
| 482 523 | 10/1991 | European Pat. Off. . |
| 553 571 | 12/1992 | European Pat. Off. . |
| 0 553 571 A1 | 12/1993 | European Pat. Off. . |
| 39 30 581 | 9/1989 | Germany . |

OTHER PUBLICATIONS

Introduction to the HP Component Monitoring System, Hewlett–Packard Journal, pp. 6–18, Oct. 1991 Christopher Westerteicher.

An Expert Alarm, Chapter 19, The Automated anesthesia Record and Alarm Systems, 1987, Yasuhiro Fukui.

Model–Based Intelligent Process Control for Cogenerator Plants, Journal of Parallel and Distributed Computing, pp. 90–102, Jun. 1992, Gabor Karsai et al.

Primary Examiner—Jack B. Harvey
Assistant Examiner—Ario Etienne

[57] ABSTRACT

An information management system comprises a computer representing a prespecified plan that is accessed by a user. The plan is for a procedure to be performed on a dynamic system having a monitored state that is indicated. The progress of the procedure is recorded. The plan is automatically updated based on the monitored state of the system. A device that indicates the monitored state is reconfigured according to the progress of the procedure.

18 Claims, 3 Drawing Sheets

INFORMATION MANAGEMENT SYSTEM FOR A DYNAMIC SYSTEM AND METHOD THEREOF

TECHNICAL FIELD

The present invention relates to an information management system for use in connection with dynamic systems.

The term 'dynamic system' refers to any system (which includes mechanical, electrical, chemical, computational and biological systems) which is subject to fluctuations in its state over time. Examples include the human body, communication sysems, aircraft, power stations, traffic systems and so on.

Performing procedures on a dynamic system is often very complicated and there is a need for information management systems to facilitate the performance of procedures and/or to compile a record of the performance of the procedures. Such activities involve knowledge of pre-planned procedures, recording which steps of the procedure have actually been carried out, monitoring the system to record its behaviour during the procedure, and reconfiguring the monitoring system in line with the particular stage of the procedure which has been reached or in line with the results of the monitored signals.

The present invention relates to a system for use when a procedure is carried out upon a dynamic system. The invention is particularly, but not exclusively, applicable to the medical domain eg in the provision of anaesthesia to patients.

BACKGROUND ART

A wide range of monitoring systems exist for monitoring dynamic systems. Most monitoring systems provide means to generate alarms. For example, when a monitored signal crosses a particular threshold value then an alarm can be signalled to the user, indicating that an undesirable condition may be present. Such thresholds are usually able to be configured to the specification of the user of the monitoring system. A known system which generates this type of alarm is a product of the applicant known as the HP Component Monitoring System and is described in the Hewlett-Packard Journal of October 1991.

There are difficulties with these known monitoring systems. Firstly, threshold alarms are relatively crude and secondly they are relatively inflexible—it would be better to be able to tailor specific alarms to be generated based upon the values of multiple signals obtained from monitoring the dynamic system. Further, it would be useful to be able to use different alarm threshold settings at different times. Proposals have been made for the generation of 'intelligent' alarms by expert systems, based upon the comparison of multiple signal values against thresholds tabulated for different conditions. One example is described in Y. Fukui "An expert alarm system" in The Automated Anesthesia Record and Alarm Systems Ed J. S. Gravenstein et. al. Butterworths, 1987. Pp 203–9.

However, the difficulty with known intelligent alarm systems is that it is often impossible to distinguish between changes in a dynamic system due to its own intrinsic behaviour (endogenous causes), and changes due to attempts to alter its behaviour by external intervention (exogenous causes). In the medical domain it can prove difficult to distinguish between changes in patient state due to the body's own mechanisms, and changes due to the intervention of a therapeutic agent or procedure.

To distinguish between endogenous and exogenous causes of changes in the behaviour of a dynamic system would require a monitoring system to have information about the exogenous actions that have been performed upon the dynamic system. Since not all such external interventions can be detected automatically, providing this information to the alarm generating system will require user input. However, there is often insufficient time for a user to input such information during the progress of a procedure being carried out on a dynamic system.

DISCLOSURE OF INVENTION

The present invention aims to provide an information management system for use in connection with dynamic systems which is an improvement on known such systems.

According to the present invention we provide an information management system comprising:

computer means for representing a prespecified plan for a procedure to be carried out on a dynamic system;

means enabling a user to access the plan;

means for recording the progress of the procedure;

monitoring means for receiving signals indicative of the state of the dynamic system;

means for indicating the monitored state of the dynamic system;

means for reconfiguring the indicating means according to the progress of the procedure;

means for automatically updating the plan based on signals received from the monitoring means.

The present invention provides an information management system which integrates components of the system in a way which overcomes many of the problems inherent in known systems. The ability to distinguish between exogenous causes of changes in the state of the dynamic system specified by the user and other causes of change detected by the monitoring system can be made an inherent feature of the information management system by using inputs from the monitoring system about the state of the dynamic system and information about the progress of the procedure being carried out on the dynamic system.

An advantage of having a prespecified procedure plan is that it reminds the user which stage of the procedure will follow the current one, and what actions will thus need to be taken. Preferably, the means for recording the progress of the procedure comprises means that enable the user to record progress with reference to the plan. An advantage of this feature is that user input can be reduced to a minimum. Preferably, the plan is presented to the user in the form of a computer representation of a book and the user can record progress by interaction with the book. The user can record progress by simply marking off items on a list of procedure steps in the plan. The act of marking the list thus generates a record of what aspects of the procedure were actually executed based upon the plan.

Preferably, the means for recording progress also comprises means for deducing the progress of the procedure from signals received from the monitoring means. Thus, the receipt of a particular signal from the monitoring means can confirm that a particular step in the procedure has been carried out, eg. if an anaesthetic plan specifies that sensors for monitoring ECG be attached to a patient, this can be deduced to have been done if the ECG signal is being received.

The system of the invention may be used to monitor and record the progress of a procedure being carried out on a dynamic system. Alternatively, the system may be active in the process.

In an embodiment to be described the system comprises means for automatically generating alarms/reminders dependent on the recorded progress of the procedure, the plan itself, and on signals received from the monitoring means and changing the relevant display(s) accordingly.

Preferably system settings are automatically reconfigured according to which stage of the procedure is underway. The prespecified plan facilitates defining the user's desired settings of alarms, which may vary with the stage of the procedure. Further, the system of the invention allows the prespecified procedure to contain configuration information relating to display of the monitored signals. When the user makes input indicating that a new phase in the procedure has commenced, the type of information displayed on the monitoring means can be altered automatically to reflect the user's specific information needs during the new phase.

Both the setting of alarms and the configuration of the monitoring displays can be embodied in the computer representation of the procedure plan, and can be activated either by user input or by the monitoring means detecting that another stage of the procedure has begun, where this is safely detectable.

Preferably, the system enables the generation of alarms based on alternative signal thresholds and automatically selects the appropriate threshold according to the circumstances pertaining at the relevant time. Therefore, a further advantage of the present invention is that it enables generation of alarms based on the setting of multiple signal thresholds. The advantage of this feature is that the user can fine tune alarms to reflect the exogenous interventions that are being made on the dynamic system. It is often a problem in known systems that alarms based upon thresholds will be triggered by interventions to a system. For example, in the measurement of the arterial blood pressure by means of an intra-arterial transducer, the blood pressure signal can be distorted by the 'flushing' of the transducer system by saline, triggering a false high blood pressure alarm. The present invention allows the alarm settings automatically to be reconfigured to reflect the effects of such an intervention.

Preferably, the system allows the user to alter the prespecified plan during enaction of the procedure, and thereby also to alter the configuration of the alarm settings and information displays on the monitoring means. For example, if a user decides to change the order of actions in a procedure, then these changes can be selected via the plan, and their effects communicated to the monitoring and display means.

Thus, by providing the ability to prespecify the planned steps of a procedure to be performed upon a dynamic system, and by including within that plan configurations of alarms and screen displays, the user is able both simply to generate a record of the actual steps of the procedure taken, as well as to guide the configuration of the alarms and displays of the monitored signals, modifying these according to the context of the current stage in the procedure.

In the embodiment to be described, the procedure being performed is anaesthesia and the dynamic system includes a patient.

BRIEF DESCRIPTION OF DRAWINGS

A specific embodiment of the present invention will now be described, by way of example, with reference to the accompanying drawings in which.

DESCRIPTION OF THE PREFERRED EMBODIMENTS

Figure 1:
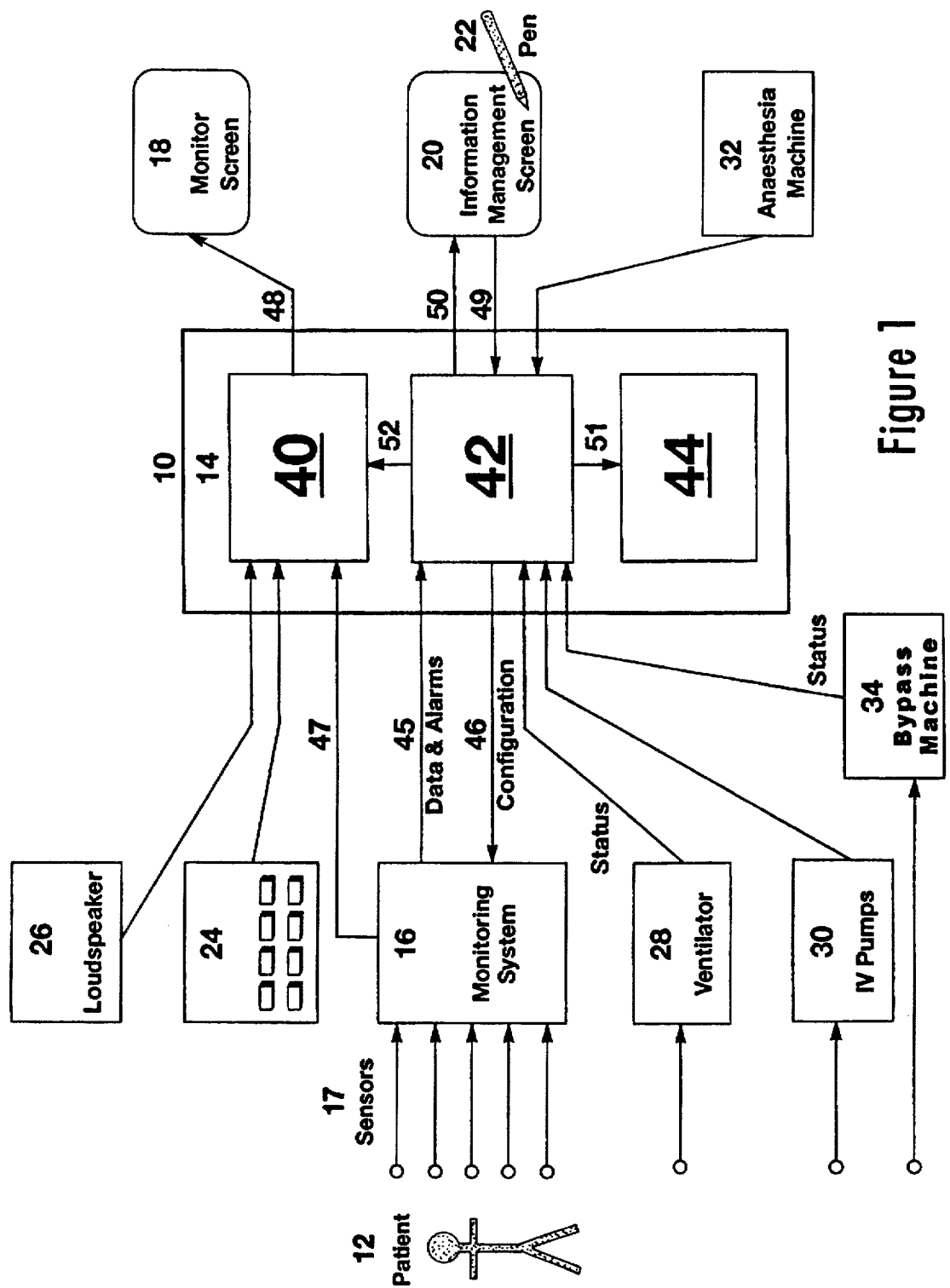
FIG. 1 is a block diagram of an information management system embodying the present invention.

Referring to FIG. 1, an information management system 10 of the present invention is illustrated for providing anaesthesia to a human patient 12. The system 10 comprises an information management module 14 which stores a procedural plan and which takes inputs from other components of the system and which provides outputs to other components of the system. The information management module runs on a general purpose computer such as a PC or Unix workstation.

The system 10 also comprises a monitoring system 16 for receiving signals (ECG, pressure waveforms etc) as a stream of raw data from sensors 17 associated with the patient 12 and processing the sensed signals for display on a monitor screen 18. The monitoring system 16 could be a conventional monitor eg. the HP Component Monitoring System which is marketed by the applicant. The monitoring system 16 implements a threshold alarm system and provides alarm notification to the information management module 14. The monitoring system 16 also accepts configuration commands from the information management module 14 including alarm threshold settings, signal processing parameters etc.

The monitor screen 18 can either be used directly by the monitoring system 16 or indirectly via the information management module 14, as shown in FIG. 1, to display monitored physiological data to the user.

There is also an information management screen 20 which is used by the information management module 14 both to display the plan and other information to the user and to accept input from the user via a pen input device 22. An input module 24 provides buttons and/or a keyboard also for user interaction with the information management module 14. Such buttons/keyboard can be used to acknowledge alarms.

A loudspeaker 26 is for providing audible warning of alarms and any other form of audible output from the system 10.

FIG. 1 also shows other external components including a ventilator 28, IV pumps 30 and the anaesthesia machine 32 itself and a bypass machine 34, all of which are standard pieces of equipment and which can be used to control the patient system dynamics and as such form part of the dynamic system which includes the patient. These pieces of equipment also provide status information about the patient 12 and their own states to the information management module 14.

The information management module 14 is implemented in a convenient high-level object-oriented language, for example Smalltalk and will now be further described with reference to FIGS. 1 and 2.

FIG. 1 shows the main components of the information management module 14 which are:

a user interface module 40 which controls the display of data that has been made available by the monitoring means 16;

a plan module 42 which stores a prespecified plan for a procedure to monitor and/or control the behaviour of the patient 12;

a data file 44 containing a record of user interactions referencing the plan stored in the module 42.

The arrows representing flows of data to and from the components of the information management module 14 will now be described:

arrow 45: monitored data and alarm messages pass from the monitoring system 16 to the plan module 42. This data may be used to trigger the selection of a particular portion of the plan for the user;

arrow 46: alarm configuration data passes from the plan module 42 to the monitoring system 16;

arrow 47: both monitored data and alarm messages can pass from the monitoring system 16 to the user interface module 40 which controls the display of the monitored data and the generation of alarm signals to the user if the plan module 42 is unavailble;

arrow 48: data concerning the display of monitored data and alarm signals passes from the user interface module 40 to the monitor screen 18;

arrow 49: data concerning user interaction with the representation of the plan which is displayed on the information management screen 20 passes from the information management screen 20 to the plan module 42;

arrow 50: data concerning the display of a representation of the plan to the user passes from the plan module 42 to the information management screen 20;

arrow 51: data concerning user interactions with the plan passes from the plan module 42 to the data file 44 to create a record;

arrow 52: data concerning display configuration settings passes from the plan module 42 to the user interface module 40.

Figure 2:
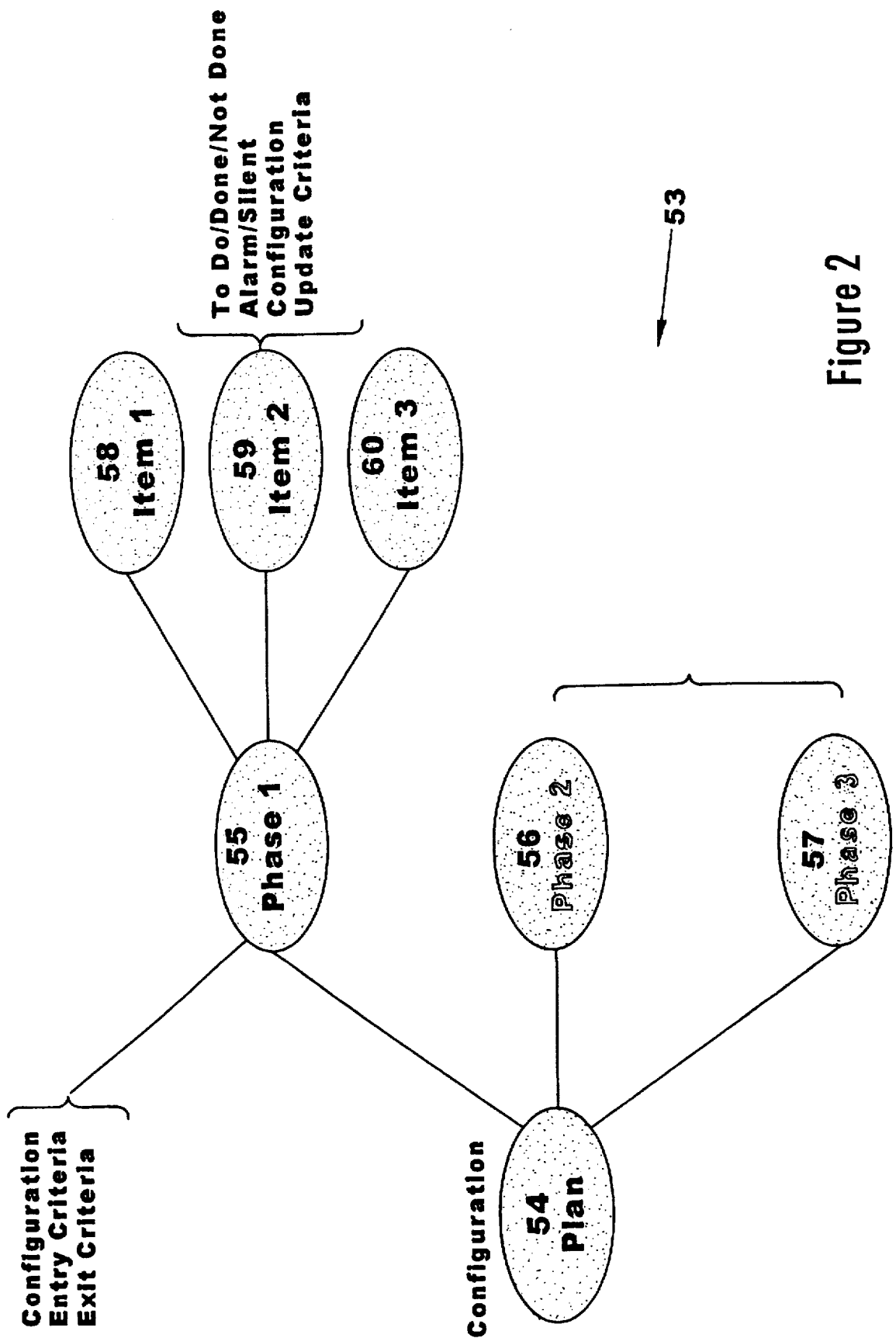
FIG. 2 is a diagram of a data structure for representing a prespecified plan.

FIG. 2 is a diagram of the data structure 53 in the information management module 14 that represents the plan stored in the plan module 42. The plan is represented as a tree of objects commencing at the root with a plan object 54, which branches to a plurality of phase objects 55, 56 and 57. The phase objects 55, 56 and 57 represent distinct segments or phases of the plan as perceived by the anaesthetist. Each phase object in turn branches to a plurality of atom objects which represent atomic components of the plan—items which must be done by the anaesthetist, or entered into the anaesthetic record. FIG. 2 shows the phase object 55 branching to three atom objects 58, 59 and 60.

Associated with each atom object 58, 59 and 60 are the following flags:

a first flag indicating whether the relevant item is still 'To Do' or has been marked as 'Done' or 'Not Done' (where 'Not Done' means that a decision was taken not to do that item);

a second flag indicating whether the relevant item is to generate an alarm if it is still 'To Do' at the end of the phase eg. omitting to indicate the action of going onto the bypass machine before commencing bypass phase during a heart bypass operation would fall into this category;

a third flag indicating whether a reconfiguration is to be applied to the rest of the system 10 when the item is 'Done' or 'Not Done' eg. giving a drug which causes a change in the alarm level;

a fourth flag 'update criteria' indicating whether an item can be considered to be 'Done' automatically in the absence of user input.

A flag equivalent to the third flag above is also associated with each phase (to be applied at the start of that phase), and the plan as a whole (to be applied when the plan is commenced). In addition, each phase has associated entry and exit criteria which permit the system automatically to progress from one phase to the next according to external inputs and in the absence of user interaction, eg. switching the bypass machine off causes the 'on bypass' phase to be exited.

Figure 3:
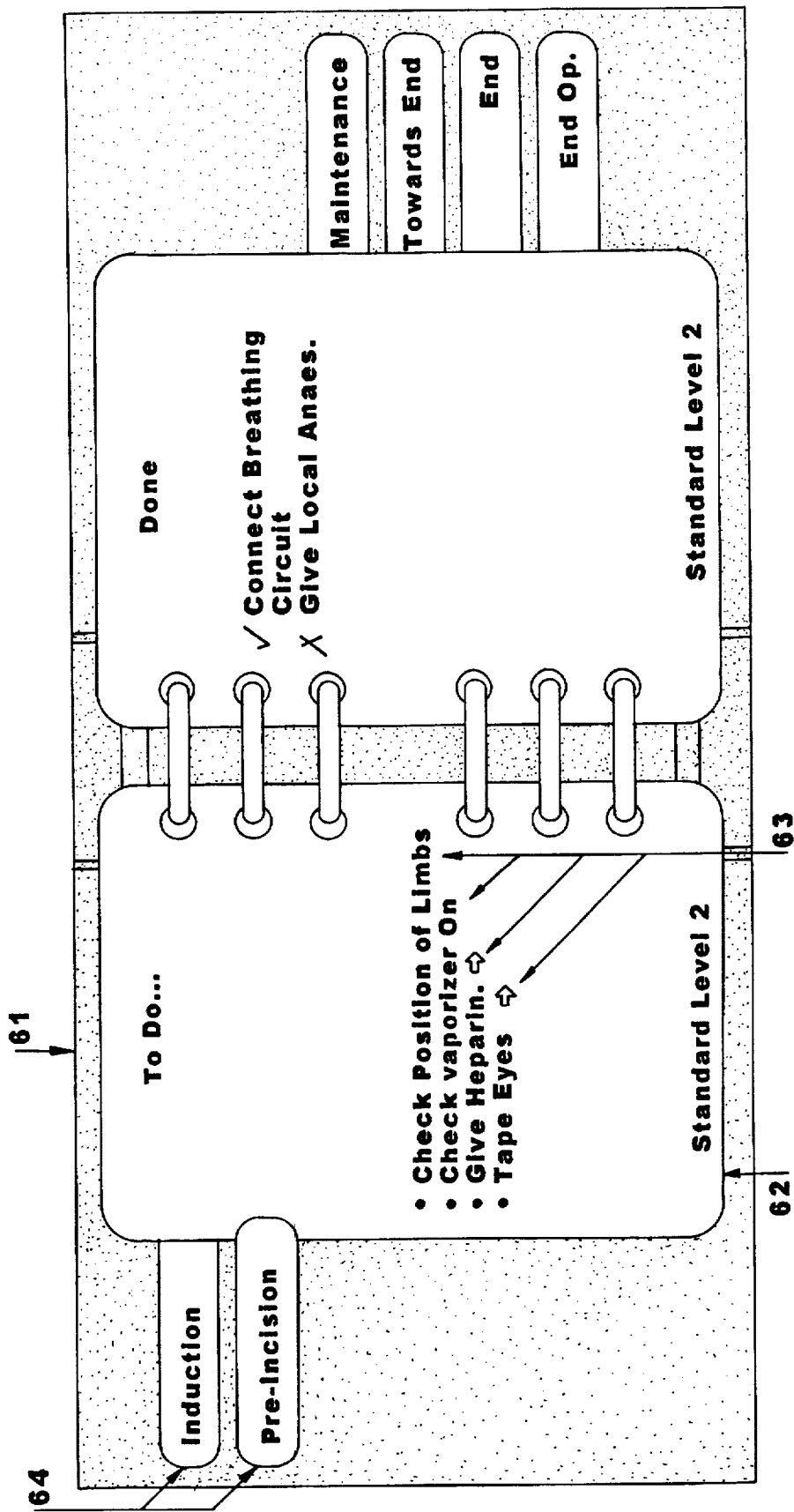
FIG. 3 is an illustration of a book representation of the plan.

FIG. 3 shows how the plan is represented to the user in the form of a loose-leaf book 61 displayed on the information management screen 20. Each phase is represented as a pair of pages 62 in the book, and action items 63 are listed in order on each page. On the left-hand page can be seen the items in a phase which are still 'To Do'. Items which have been 'Done' or 'Not Done' are moved to the right-hand page and marked with a tick or cross accordingly. Pages representing phases other than the current one are indicated by 'tabs' 64 shown on the left and right of the book 61. As shown in FIG. 3 there are five phases:

induction/pre-incision/maintenance/towards end/end/end op.

The number and nature of the phases varies somewhat according to the approach of the individual who prespecifies the plan.

User interaction with the displayed plan is via the pen input device 22 of FIG. 1 used directly on the surface of the information management screen 20 which is sensitive to pen input or via the module 24. The information management module 14 recognises various gestures (clicking—simply pressing down with the pen at a particular point; ticking—moving the pen to write a tick on the screen 20; crossing—moving the pen to write a cross on the screen 20).

A phase is selected by clicking on the relevant tab 64. The book 61 then opens to that page 62. Phases may be selected in any order, forwards or backwards. 'To Do' items are recorded as 'Done' by ticking directly on them, or 'Not Done' by crossing them. Crossing a 'Done' or 'Not Done' item will return its status to 'To Do' and move it back to the left-hand page.

If the user attempts to turn to a new page, indicating a wish to move to a new phase of the plan, whilst the existing page (phase) still has items which are 'To Do', an alarm will be generated in the form of a dialog box warning the user that there are pending items provided that the outstanding items have the Alarm/Silent flag set to Alarm.

Thus it can be seen that only user action items and then only the action items which are relevant to the user in the current phase of the procedure being carried out are displayed in the user representation of the plan.

The record of user interactions with the plan which is stored in the data file 44 can be used to form part of the patient record.

An example of the way the embodiment of the present invention described above can be used will now be described.

Patients undergoing surgery represent an example of a complex dynamic system, and the provision of an anaesthetic to a patient during surgery represents an example of a control task. The anaesthetist attempts by way of administration of pharmacological agents to anaesthetise a patient to a required level for a particular procedure to be carried out.

Typically the provision of an anaesthetic is a planned activity, and at its simplest, is described as having three phases—commonly called induction, maintenance and emergence. Each of these anaesthetic phases thus corresponds to a specific subcomponent of the overall plan for the anaesthesia procedure.

The requirements for alarm settings vary across these phases. For example, the alarm settings for end tidal CO2 (ETCO2) cover a wider range in induction than in maintenance, as the patient's CO2 levels rise beyond normally accepted boundaries as a result of the steps taken by the anaesthetist during induction.

Let us assume that the system 10 has been loaded with a simple plan with the following structure (this is not a full anaesthetic plan, just a fragment of one as an example):

```
Anaesthetic Plan:

Phase: Induction
        Alarms:
            ETCO2 alarms setting = (wider than normal limits)
        Screen 18:
            display ECG
            display SaO2
        Actions:
            preoxygenate
            give iv anaesthetic
            intubate patient
    Phase: Maintenance
        Alarms:
            ETCO2 alarms setting = (normal limits)
        Screen 18:
            display ECG
            display heart rate
            display SaO2
            display ETCO2
        Actions:
            give muscle relaxant
    Phase: Emergence
        Alarms:
            ETCO2 alarms setting = (normal limits)
        Screen 18:
            display ECG
            display SaO2
        Actions:
            Turn off anaesthetic agent
            Reverse muscle relaxation
```

The plan is presented to the anaesthetist in the form of the book 61, with each pair of pages 62 of the book corresponding to a phase of the anaesthesia procedure.

At the beginning of the induction phase, the anaesthetist selects the induction pages in the book 61. This causes the system 10 to set alarm limits according to those described in the plan above for the induction phase, and to display the parameters specified in the plan. The alarm limits are set by transferring data concerning the desired settings from the plan module 42 to the monitoring system 16 via arrow 46 in FIG. 1. The parameters specified in the plan are displayed as result of data concerning the parameters to be displayed being passed from the plan module 42 to the user interface module 40 via arrow 52 in FIG. 1.

As the anaesthetist completes the required actions in this phase of the anaesthesia, the corresponding items on the list are checked off the list displayed on the information management screen 20. This causes the system 10 to note that the action was completed and to cause the data file 44 shown in FIG. 1 to be updated accordingly, and also allows it automatically to log the time at which the action was noted to have been completed. When the anaesthetist has completed the induction stage, and chooses to move into the next maintenance phase of the anaesthetic, the maintenance page of the book 61 is selected, with the consequence that alarms and screens are reconfigured to the specifications within the plan for the maintenance phase.

The anaesthetist continues in a similar manner, checking items on the plan that are actually completed, or electing not to check items if they are not completed, and moving through the plan stages, until the anaesthesia procedure is completed.

In a second embodiment of the present invention the information management system is primarily for monitoring and recording the progress of a procedure and does not generate alarms. This second embodiment only differs from the first embodiment described above in that there would be no need for a loudspeaker or for the monitoring system 16 to trigger alarms. The user would still record the progress of the procedure using the plan represented by the book 61 and use the monitor screen 18 to get information about the state of the patient.

We claim:

1. An information management system comprising:
    a monitoring arrangement for receiving signals indicative of a state of a dynamic system;
    an output device for indicating a monitored state of the dynamic system based on said signals;
    a computer configured to:
        (a) maintain a representation of a prespecified plan for a procedure to be carried out on the dynamic system;
        (b) record data concerning the progress of the procedure;
        (c) automatically update the representation of the plan based on signals received from the monitoring arrangement; and
        (d) reconfigure the output device according to the data concerning the progress of the procedure; and
    an interface device for enabling a user to access the representation of the plan.

2. The system according to claim 1 wherein the computer is further configured to enable the user to record data concerning the progress with reference to the representation of the plan.

3. The system according to claim 1 wherein the representation of the plan is presented to the user in the form of a computer representation of a book so the user can record data concerning the progress of the procedure by interacting with the book.

4. The system according to claim 1 wherein the computer is further configured to deduce data concerning the progress of the procedure in response to signals derived by the monitoring arrangement.

5. The system according to claim 1 wherein the computer is further configured to generate alarm/reminders dependent on the data concerning the progress of the procedure, the representation of the plan, and signals derived by the monitoring arrangement.

6. The system according to claim 1 wherein settings are automatically reconfigured according to the data concerning the progress of the procedure.

7. The system according to claim 1 wherein the computer is further configured to generate alarms based on alternative signal thresholds and automatically select the appropriate threshold according to the circumstances pertaining at the relevant time.

8. The system according to claim 1 wherein the computer is further configured to permit the user to alter the representation of the prespecified plan.

9. The system according to claim 1 wherein the plan is for an anaesthesia procedure and the dynamic system includes a patient.

10. A method of managing information about a dynamic system in response to actions by a user, comprising the steps of:
    maintaining a representation of a prespecified plan for a procedure to be carried out on said dynamic system;
    accessing the representation of the plan in response to input from the user;
    recording data concerning the progress of the procedure;
    monitoring signals indicative of the state of the dynamic system to provide an indication of a monitored state of the dynamic system;

automatically updating the representation of the plan based on said signals; and reconfiguring how the monitored state of the dynamic system is indicated according to data concerning the progress of the procedure.

11. The method of claim 10 wherein the step of recording data concerning the progress of the procedure comprises the step of recording data derived in response to an action by the user concerning the progress of the procedure with reference to the representation of the plan.

12. The method of claim 10 further comprising the steps of:

presenting to the user the representation of the plan in the form of a computer representation of a book and recording data, derived in response to an interaction by the user with the computer representation of the book, concerning the progress of the procedure.

13. The method of claim 10 wherein the step of recording data concerning the progress of the procedure comprises the step of deducing data concerning the progress of the procedure from said signals.

14. The method of claim 10 further comprising the step of automatically generating alarm/reminders dependent on the data concerning the progress of the procedure, the representation of the plan, and said signals.

15. The method of claim 10 further comprising the step of automatically reconfiguring setting according to data concerning the progress of the procedure.

16. The method of claim 10 further comprising the steps of generating alarms based on alternative signal thresholds and automatically selecting an appropriate alternative threshold according to the circumstances pertaining at the relevant time.

17. The method of claim 10 further comprising the step of altering the representation of the prespecified plan in response to a command by the user.

18. The method of claim 10 wherein the step of storing a representation of a prescribed plan for a procedure to be carried out on said dynamic system includes the step of storing said representation of said prescribed plan for an anaesthesia procedure to be carried out on a patient.

* * * * *